S. GOLUBICS.
SOCKET JOINT FOR COLLAPSIBLE PILLARS OF CABRIOLET BODIES OF AUTOMOBILES.
APPLICATION FILED OCT. 14, 1918.
1,322,165.
Patented Nov. 18, 1919.
3 SHEETS—SHEET 2.
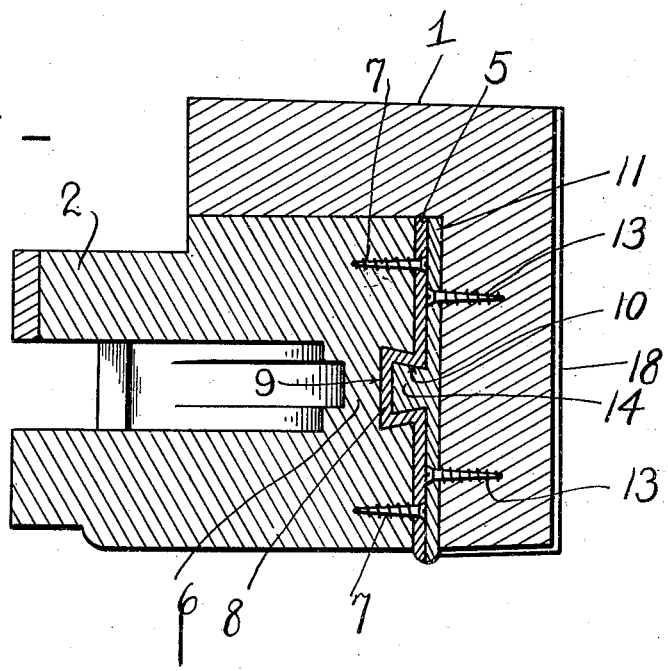
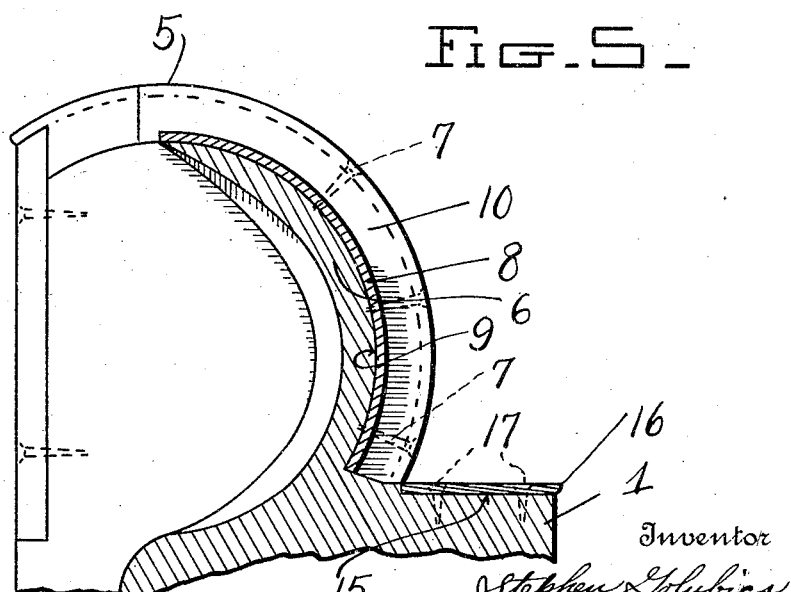

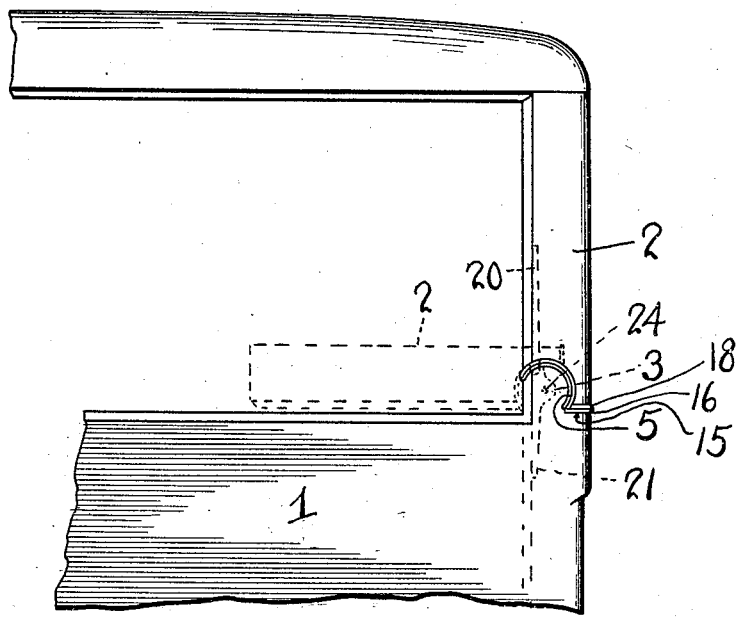
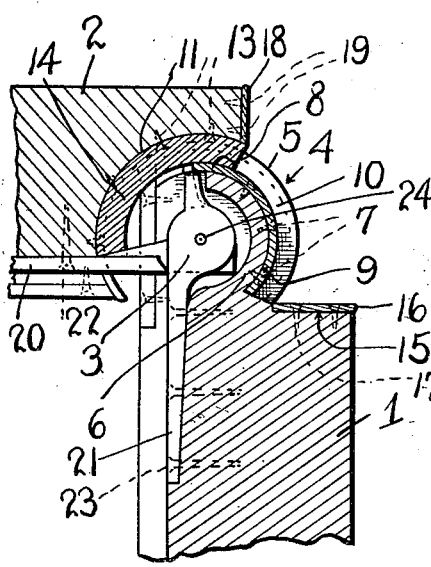
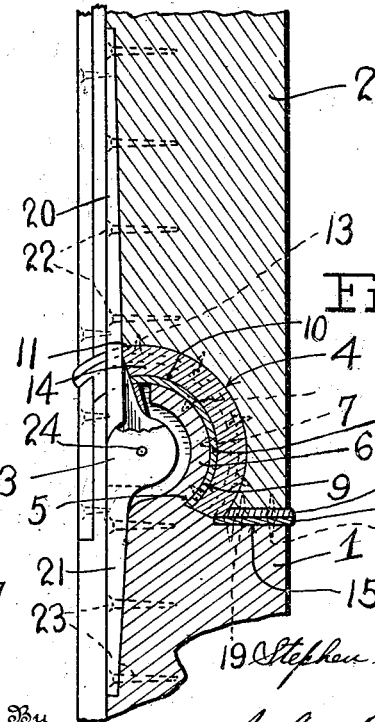

S. GOLUBICS.
SOCKET JOINT FOR COLLAPSIBLE PILLARS OF CABRIOLET BODIES OF AUTOMOBILES.
APPLICATION FILED OCT. 14, 1918.
1,322,165.
Patented Nov. 18, 1919.
3 SHEETS—SHEET 3.
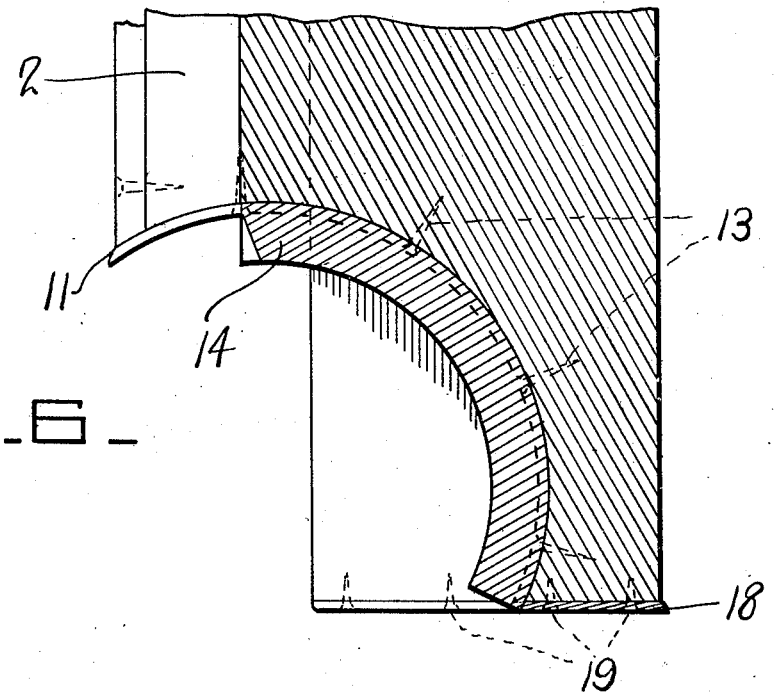
Fig. 6.
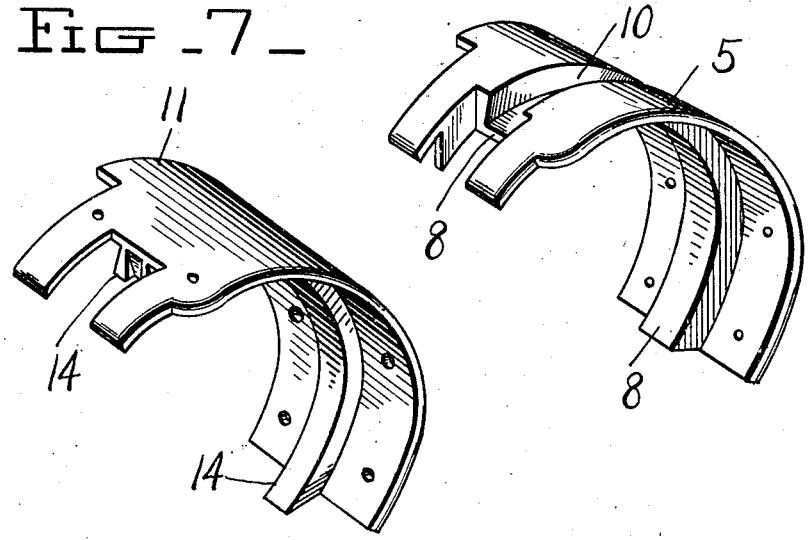
Fig. 7.
Fig. 8.
Inventor
Stephen Golubics
By John P. Duffie
Attorney

UNITED STATES PATENT OFFICE.

STEPHEN GOLUBICS, OF FLEETWOOD, PENNSYLVANIA, ASSIGNOR TO THE FLEETWOOD METAL BODY COMPANY, OF FLEETWOOD, PENNSYLVANIA.

SOCKET-JOINT FOR COLLAPSIBLE PILLARS OF CABRIOLET-BODIES OF AUTOMOBILES.

1,322,165.     Specification of Letters Patent.     Patented Nov. 18, 1919.

Application filed October 14, 1918. Serial No. 258,066.

*To all whom it may concern:*

Be it known that I, STEPHEN GOLUBICS, a citizen of the United States, residing at Fleetwood, in the county of Berks and State of Pennsylvania, have invented certain new and useful Improvements in Socket-Joints for Collapsible Pillars of Cabriolet-Bodies of Automobiles, of which the following is a specification.

This invention relates to new and useful improvements in automobile bodies and more especially to what may be termed a socket joint for the collapsible pillars on cabriolet bodies.

The primary object of this invention is to provide a socket joint of this character which is simple and economical in construction, durable in use, absolutely water and dust proof and ornamental in appearance.

With the foregoing and other objects in view that will appear as the nature of the invention is better understood, the same consists in the novel features of construction, combination and arrangement of parts illustrated in the drawings and more particularly pointed out in the appended claim.

In the accompanying drawings:—

Figure 1 is a fragmentary front elevation of an automobile body of the cabriolet type, illustrating the application of my invention, the dotted lines indicating the collapsed position of the pillar.

Fig. 2 is a detail fragmentary sectional view of a portion of the automobile body and the pillar, showing more fully the use of my socket joint, the pillar shown in collapsed position.

Fig. 3 is a view similar to Fig. 2, with the pillar in upright or operative position.

Fig. 4 is a horizontal section taken through the socket joint, with the parts represented on an enlarged scale.

Fig. 5 is a vertical transverse section of Fig. 4, with parts omitted.

Fig. 6 is a fragmentary sectional view on an enlarged scale of the lower end of the collapsible pillar and one member of the socket joint and Figs. 7 and 8 are detail perspective views of the socket joint members, disposed in juxtaposition.

Referring to the drawings for a more particular description of the invention and which drawings are for illustrative purposes only and are therefore not drawn to scale, the numeral 1 indicates the automobile body, 2 the collapsible pillar, 3 the usual hinge for hingedly connecting the latter to the body and 4 the socket joint for the collapsible pillar, as a whole.

As shown, this socket joint comprises a stationary arc shaped plate or member 5 which conforms in contour with and is secured to the top or outer surface of the rounded portion 6 of the body by the fastening screws 7 or other equivalent means. This plate or member 5 is provided with a central longitudinal rib 8 which fits in a corresponding groove or recess 9 formed in the aforesaid rounded portion 6, which rib is formed throughout its entire length with a longitudinal groove or channel 10, of dove-tail form in cross-section. The other or companion member 11 of the socket joint, which is also of arc-shaped form and is secured in a corresponding recess or cut-away portion in the lower inner corner of the pillar by fastening screws 13 or other equivalent means, is formed on its outer surface with a central longitudinal rib 14 of dove-tail form in cross-section which is slidably received by the dove-tail groove and channel 10 of member 5.

The shoulder or ledge 15 of the automobile body is preferably reinforced and protected by the metal plate 16 secured in place by the fastening screws 17, while the lower end and exposed portion of the pillar is reinforced and protected by a metal plate 18 which is held in place by the fastening screws 19 and rests on or abuts the plate 16 when the pillar is in upright or operative position.

The hinge 3, which is of the usual construction and constitutes no part of this invention, comprises the upper and lower hinged sections 20 and 21, respectively, which are secured to the pillar and body by the fastening screws 22 and 23 and are hingedly connected together at their inner ends, as at 24, in the usual manner.

The full lines in Figs. 1 and 3 of the drawings represent the upright or operative position of the pillar and the dotted lines in Fig. 1 and full lines in Fig. 2, the collapsed position of same.

From the foregoing description taken in connection with the drawings, it is thought that the construction, operation and advantages of this invention will be readily understood without requiring a more extended explanation.

Various changes in the form, proportions and minor details of construction may be resorted to without departing from the principles or sacrificing any of the advantages of this invention as defined in the appended claim.

Having described my invention, what I claim as new and desire to secure by Letters Patent, is:—

In combination with the collapsible pillar of an automobile body, an upstanding rounded off-set on the body beneath the lower end of said pillar and a socket joint for the pillar, comprising a stationary arc-shaped member rigidly secured to the top of said rounded off-set, said member formed with a central longitudinal groove or channel of dove-tail form in cross-section extending throughout the entire length thereof, and a second arc-shaped member carried by the lower end of the pillar, said second member working over the outer face of the first mentioned member and having a central longitudinal rib or tongue formed upon and extending inwardly from the inner surface, said tongue received by and slidably engaging the aforesaid groove or channel.

In testimony whereof I affix my signature.

STEPHEN GOLUBICS.